(12) United States Patent
Jayaram et al.

(10) Patent No.: US 8,181,761 B2
(45) Date of Patent: May 22, 2012

(54) CLUTCH UNIT

(75) Inventors: Mavinkal Jayaram, Broadview Heights, OH (US); Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 434 days.

(21) Appl. No.: 12/384,473

(22) Filed: Apr. 4, 2009

(65) Prior Publication Data

US 2010/0170765 A1 Jul. 8, 2010

Related U.S. Application Data (60) Provisional application No. 61/123,033, filed on Apr. 4, 2008.

(51) Int. Cl.
*F16D 13/36* (2006.01)

(52) U.S. Cl. .................. 192/70.27; 192/89.24; 74/500.5

(58) Field of Classification Search .................. 74/500.5; 192/89.24, 89.22, 89.21, 99 S
See application file for complete search history.

(56) References Cited

U.S. PATENT DOCUMENTS

| | | | | |
|---|---|---|---|---|
| 3,124,377 A | * | 3/1964 | O'Brien et al. | 403/1 |
| 3,392,812 A | * | 7/1968 | Kaptur et al. | 192/99 R |
| 4,086,995 A | * | 5/1978 | Spokas | 192/70.251 |
| 4,214,653 A | * | 7/1980 | Slack | 192/48.7 |
| 5,513,734 A | * | 5/1996 | Scotti | 192/70.27 |
| 6,405,846 B1 | * | 6/2002 | Reik et al. | 192/70.252 |
| RE38,389 E | * | 1/2004 | Fukuda | 192/70.27 |
| 2009/0260943 A1 | * | 10/2009 | Jayaram et al. | 192/70.23 |

* cited by examiner

*Primary Examiner* — David D Le
*Assistant Examiner* — Lillian Nguyen
(74) *Attorney, Agent, or Firm* — Alfred J. Mangels (57) ABSTRACT

A clutch unit including a clutch hub that is non-rotatably mounted to a shaft. The clutch unit has at least two clutch elements that can be brought into frictional engagement with one another in order to transmit torque when the clutch unit is actuated through a mechanical actuation device. The actuation device is mounted and supported at the clutch unit.

35 Claims, 12 Drawing Sheets

CLUTCH UNIT

BACKGROUND OF THE INVENTION

1. Field of the Invention

The present invention relates to a clutch unit having a clutch hub that is non-rotatably mounted to a shaft. The clutch unit includes at least two clutch elements that can be brought into frictional engagement with one another for torque transmission when the clutch unit is actuated through a mechanical actuation device by means of a pull cable.

2. Description of the Related Art

From the German publication document DE 28 45 875 A1, a device for non-rotatable connection and separation of a driving element and a driven element is known, which is actuated by means of a Bowden cable. The layout unit of the clutch unit includes a lever end, at which, on the one hand, the core wire of the Bowden cable is connected, and a spring on the other hand. The layout unit includes a sleeve with a high pitch thread, in which sleeve balls are inserted. The opposite piece of the high pitch thread is provided at a pot shaped structure in the form of bulges. The core wire of the Bowden cable causes a rotation of the sleeve relative to a stationary component fixed at the motor. Through the connection to the stationary component, which is fixed at the motor, oscillations and vibrations can be transferred during operation, which can lead to undesirable noise generation. From the U.S. Pat. Nos. 1,549,976; 3,374,628; 4,310,083; 5,713,446, and 5,947,857, further clutch units are known, in which undesirable noise can be generated.

It is an object of the present invention to provide a clutch unit which is simple in construction, and which can be produced at competitive cost. Thus, in particular, an undesirable noise generation during operation of an internal combustion engine configured with the clutch unit can at least be significantly reduced.

SUMMARY OF THE INVENTION

The object is achieved with a clutch unit having a clutch hub, and which is non-rotatably mounted to a shaft. The clutch unit includes at least two clutch elements that can be brought into frictional engagement with one another for torque transmission when the clutch unit is actuated through a mechanical actuation device by means of a pull cable, by mounting and supporting the actuation device at the clutch unit. In accordance with a substantial aspect of the invention, the actuation device is separated from the suspension or body of a vehicle configured with the clutch unit, e.g. a motorcycle. Only the pull cable is supported at the actuation device, which pull cable is actuated e.g. by means of a hand actuation lever, which is e.g. pivotably supported at the handlebar of a motorcycle. Mounting and supporting the actuation device at the clutch unit, among other things, provides the advantage that no vibrations or noise can be transmitted through the actuation device to the vehicle body. The actuation device is preferably configured purely mechanically and does not include electrical components. The pull cable is a cable, preferably made of wire, for transmitting tensile forces. The pull cable is preferably guided in a pull cable sleeve so it can be moved back and forth, and it is also designated as a Bowden cable. The clutch unit in accordance with the invention is biased in its closed position, preferably through a disk spring, which is also designated as a membrane spring. In the closed position, the clutch elements, e.g. the disks of a disk clutch, are in frictional engagement. Through the actuation device, the clutch elements, which are in frictional engagement, are separated from one another; that means they are disengaged. Therefore, the actuation device can also be designated as a disengagement device.

A preferred embodiment of the clutch unit is characterized in that the actuation device is mounted to the shaft together with the clutch unit. The shaft is e.g. the drive shaft or the crankshaft of an internal combustion engine. The actuation device is preferably not directly mounted onto the shaft, but with additional elements connected therebetween.

Another preferred embodiment of the clutch unit is characterized in that the actuation device is supported at the clutch unit in the axial direction. The term "axial" relates to the axis of rotation of the shaft. "Axial" means in the direction of, or parallel to the axis of rotation of the shaft. In accordance with an essential aspect of the invention, the actuation device is not supported at the vehicle frame in the axial direction.

Another preferred embodiment of the clutch unit is characterized in that the actuation device is supported at the shaft in the axial direction. The actuation device is preferably not supported directly at the shaft, but with additional elements connected therebetween.

Another preferred embodiment of the clutch unit is characterized in that the actuation device is clamped between the clutch hub and a disk spring in the axial direction. Preferably, axial support bearing devices are disposed between the components of the clutch unit, which rotate during operation, and between the components of the actuation device, so that no rotating movements are transmitted.

Another preferred embodiment of the clutch unit is characterized in that the actuation device includes two lever elements that are pivotably disposed at the clutch unit. The pivotable mounting of the lever elements facilitates moving the lever elements relative to one another by means of the pull cable, in order to actuate the clutch unit, in particular in order to disengage it.

Another preferred embodiment of the clutch unit is characterized in that the lever elements respectively include a coupling arm that is coupled to the pull cable or to a pull cable sleeve, so that the coupling arms move toward one another when the coupling device is actuated by means of the pull cable. Preferably, a free end of the pull cable is coupled with one coupling arm and a free end of the pull cable sleeve is coupled with the other coupling arm. The free end of the pull cable is preferably coupled with a manual actuation lever that is pivotably mounted, e.g. to a handlebar of a motorcycle. The other end of the pull cable sleeve is preferably mounted to a portion of the handlebar of the motorcycle that is fixed relative to the hand actuation lever.

Another preferred embodiment of the clutch unit is characterized in that a lever arm respectively extends from the ends of the coupling arm, which lever arm includes a connection section from which a support section extends at an angle. The lever arms are substantially configured L-shaped and are preferably integrally connected with the associated coupling arms.

Another preferred embodiment of the clutch unit is characterized in that a pivot finger extends at an angle from the free end of the support section, which pivot finger engages a recess of a base plate so that the associated lever element is pivotable within limits relative to the base plate. The pivot finger is preferably integrally connected with the support section and has e.g. a rectangular cross section. The configuration and the size of the recess are preferably adapted to the configuration, in particular to the cross section, of the pivot finger, so that the pivot finger can move in the recess within limits.

Another preferred embodiment of the clutch unit is characterized in that a respective lift pin extends in parallel to the coupling arms between the two lever arms of the lever elements. When the lever elements move relative to one another, the lift pins also move relative to one another. The movement of the lift pins relative to one another is caused by the pull cable. The movement of the lift pins relative to one another is caused by the lever elements. The movement of the lift pins relative to one another is used in order to actuate the clutch unit, in particular to disengage it.

Another preferred embodiment of the clutch unit is characterized in that the lift pin extends between the portions in which the connection sections and the support sections of the lever arms extend into one another. The support sections extend preferably at a right angle from the connection sections. The ends of the lift pins are inserted e.g. into the pass-through holes, which are recessed in the transition portions between the connection sections and the support sections.

Another preferred embodiment of the clutch unit is characterized in that the lift pin of the one lever element is disposed proximal to the pivot axis of the other lever element. The pivot axis of the lever elements is defined by the pivot fingers and by the contact of the support section at the base plate. Through the special disposition of the lift pins, it is accomplished that the lift elements substantially move on a circular arc about the pivot axis of the associated lever element when the clutch unit is actuated by means of the pull cable.

Another preferred embodiment of the clutch unit is characterized in that the lift pins are connected to a lift plate that moves in the axial direction away from the base plate when the clutch unit is actuated by means of the pull cable. The lift plate is guided in the axial direction, so that the circular movement of the lift pins is converted into an axial movement of the lift plate.

Another preferred embodiment of the clutch unit is characterized in that the lift pins are disposed in the axial direction between the lift plate and a synchronizer plate that is mounted to the lift plate. The synchronizer plate assures that the lift pins move synchronously to one another.

Another preferred embodiment of the clutch unit is characterized in that the lift plate interacts with a disk spring in the axial direction, through which the clutch elements are held in frictional engagement as long as the clutch unit is not actuated by means of the pull cable. The clutch unit, which is e.g. configured as a disk clutch, is biased into its engaged position by the disk spring, which can also be designated as membrane spring, wherein the clutch elements are in frictional engagement in the closed position so that torque is transmitted between the clutch elements. The closed position is also designated as the engaged position. Through the actuation device, the coupling elements are moved out of frictional engagement against the biasing force of the disk spring, which means the clutch elements are moved away from one another.

Another preferred embodiment of the clutch unit is characterized in that the lift plate includes at least one radially outwardly disposed rim portion that interacts with the disk spring. The rim portion can be configured to be circumferential, or it can be divided into particular rim portion segments. The axial biasing force of the disk spring is supported at the clutch hub through the lift plate.

Another preferred embodiment of the clutch unit is characterized in that the lift plate includes at least one radially inwardly disposed contact portion, which is axially offset from the radially outward disposed rim portion, at which the lift pins contact. The contact portion is preferably integrally connected to the rim portion of the lift plate. Through that connection, the axial movement of the contact portion is transferred to the rim portion of the lift plate.

Another preferred embodiment of the clutch unit is characterized in that the radially inwardly disposed contact portion extends radially outwardly from a guide sleeve of the lift plate. The guide sleeve is preferably integrally connected to the contact portion of the lift plate. Through the guide sleeve, it is assured that the lift plate can only move in the axial direction.

Another preferred embodiment of the clutch unit is characterized in that an axial support device is disposed axially between the disk spring and the lift plate. The axial support device prevents transmission of a rotational movement of the disk spring to the lift plate during operation.

Another preferred embodiment of the clutch unit is characterized in that an adapter ring is disposed axially between the disk spring and the axial support device. Preferably, disk spring tongues of the disk spring contact the adapter ring.

Another preferred embodiment of the clutch unit is characterized in that another axial support device is disposed axially between the base plate and the clutch hub. The additional clutch unit prevents the transmission of rotation of the clutch hub to the base plate during operation.

Another preferred embodiment of the clutch unit is characterized in that the actuation device includes a first coupling element, at which a pull cable sleeve is supported, from which the pull cable extends to a second coupling element, which is disposed at the clutch unit, so it can move relative to the first coupling element. Preferably, a free end of the pull cable is hooked into the second coupling element. The other free end of the pull cable is preferably hooked into a hand actuation lever, which is pivotably mounted, e.g. at the handlebar of a motorcycle.

Another preferred embodiment of the clutch unit is characterized in that the first coupling element includes a frame that extends about an inner tubular body. For assembly purposes, the frame is initially provided open after fabrication, and is deformed after assembly so that it is closed.

Another preferred embodiment of the clutch unit is characterized in that the first coupling element includes form locking elements that engage the inner tubular body. The form locking elements are used for connecting the first coupling element to the inner tubular body in a form locking manner.

Another preferred embodiment of the clutch unit is characterized in that the inner tubular body includes a shoulder that is supported at the clutch hub in the axial direction. The shoulder of the inner tubular body is clamped between a disk spring and the clutch hub, preferably with additional elements connected in between. Thus, the inner tubular body, as well as the first coupling element, is held at the clutch unit, in particular at the clutch hub.

Another preferred embodiment of the clutch unit is characterized in that an axial support device is disposed in the axial direction between the shoulder of the inner tubular body and the clutch hub. The axial support device prevents transmission of rotation of the clutch hub to the inner tubular body and to the first coupling element during operation.

Another preferred embodiment of the clutch unit is characterized in that the inner tubular body is centered relative to the shaft by means of a centering element. The centering element is preferably supported indirectly at the shaft in the radial direction.

Another preferred embodiment of the clutch unit is characterized in that the centering element is rotatably supported on a screw element, by means of which the clutch hub is mounted to the shaft. The rotatable support of the centering element is facilitated e.g. by a straight bearing bushing, which is disposed between the screw element and the centering element. The screw element is preferably screwed onto a free end of the shaft.

Another preferred embodiment of the clutch unit is characterized in that the outer tubular body is rotatably disposed relative to the inner tubular body. The inner tubular body is configured with at least one flattened portion, which is disposed in the portion of the recess of the inner tubular body. The outer tubular body can be rotatably supported on the inner tubular body.

Another preferred embodiment of the clutch unit is characterized in that the outer tubular body includes a shoulder that is supported at the clutch hub in the axial direction. Through the shoulder of the outer tubular body, an actuation force, in particular a disengagement force, is imparted upon the disk spring. Preferably, the shoulder of the outer tubular body contacts the shoulder of the inner tubular body.

Another preferred embodiment of the clutch unit is characterized in that the shoulder of the outer tubular body can be loaded with the biasing force of one disk spring or with the biasing force of the disk spring. Through the biasing force of the disk spring, the outer tubular body, together with the inner tubular body and the coupling elements, is supported at the clutch unit, in particular at the clutch hub.

Another preferred embodiment of the clutch unit is characterized in that an axial support device is disposed axially between the disk spring and the shoulder of the outer tubular body. The axial support device prevents transmission of rotation of the disk spring to the outer tubular body.

Another preferred embodiment of the clutch unit is characterized in that an adapter ring is disposed axially between the disk spring and the axial support device. Preferably, disk spring tongues of the disk spring contact the adapter ring.

Another preferred embodiment of the clutch unit is characterized in that the second coupling element includes a coupling pin that extends through at least one inner slot that is provided in the inner tubular body, and through at least one outer slot that is provided in the outer tubular body. The inner slot is used for guiding the coupling pin transversely to the axis of rotation of the coupling device. Through the interaction between the guided movements of the coupling pin with the outer slot, an axial movement of the outer tubular body relative to the inner tubular body is caused.

Another preferred embodiment of the clutch unit is characterized in that the outer slot extends at an angle relative to the inner slot. Through the size of the angle, the amount of the axial movement of the outer tubular body can be adjusted.

Another preferred embodiment of the clutch unit is characterized in that the angle between the slots is greater than zero and less than 90°. The angle is approximately 45°.

Another preferred embodiment of the clutch unit is characterized in that the inner slot extends transversely with reference to the rotation axis of the clutch unit. The inner slot is preferably disposed in a flattened portion of the inner tubular body.

Another preferred embodiment of the clutch unit is characterized in that the pull cable can be actuated through a hand actuation lever. The hand actuation lever is e.g. pivotably mounted at a handlebar of a motorcycle. The actuation of the pull cable through the hand actuation lever is performed as customary in motorcycles.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

FIGS. 1 through 10 show a clutch unit 1 in various perspective views. The clutch unit 1 includes an actuation device 2, through whose actuation clutch elements 4, which are in frictional engagement, can be disengaged from one another. The clutch elements 4 are e.g. disks, in particular inner disks and outer disks, which are disposed in a disk set.

The actuation device 2 is actuated by a pull cable device 5, which includes a pull cable 6, which is guided by a pull cable sleeve 7. The pull cable 6 is shown cut off in FIG. 1. The cut off end of the pull cable 6 is mounted e.g. to a hand actuation lever, which is pivotably mounted to a motorcycle handlebar. The pull cable sleeve 7 is also shown cut off. The cut off end of the pull cable sleeve 7 is e.g. mounted to a stationary component of the motorcycle handlebar.

Figure 1:
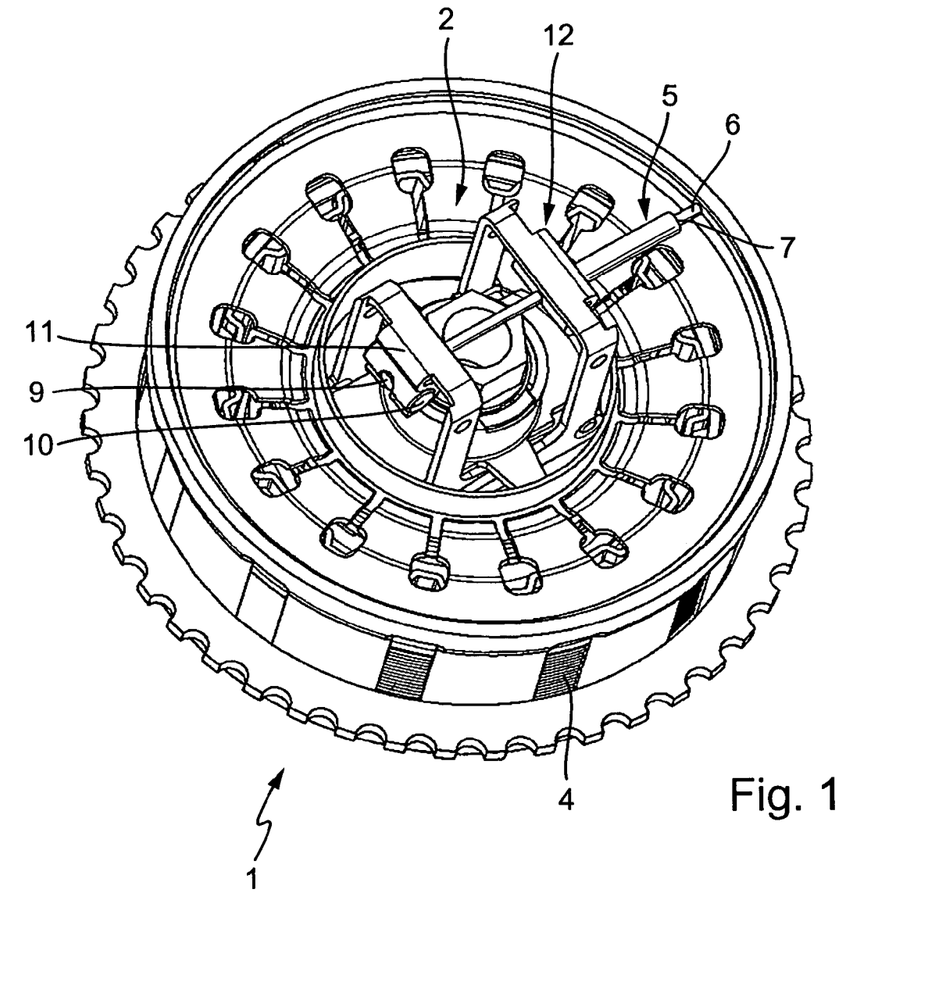
FIG. 1 is a perspective view of a clutch unit in accordance with a first embodiment of the present invention looking at an actuation device.

The end 9 of the pull cable 6, which is visible in FIG. 1, is mounted to a first lever element 11, in particular hooked into the first lever element 11, by means of a pull cable adapter 10. The end of the pull cable sleeve 7, which is visible in FIG. 1, is mounted to a second lever element 12, so that the lever elements 11, 12 move toward one another when the pull cable 6 is pull-loaded by the hand actuation lever (not shown). In accordance with an essential aspect of the invention, the actuation device 2 is mounted to the clutch unit 1.

Figure 2:
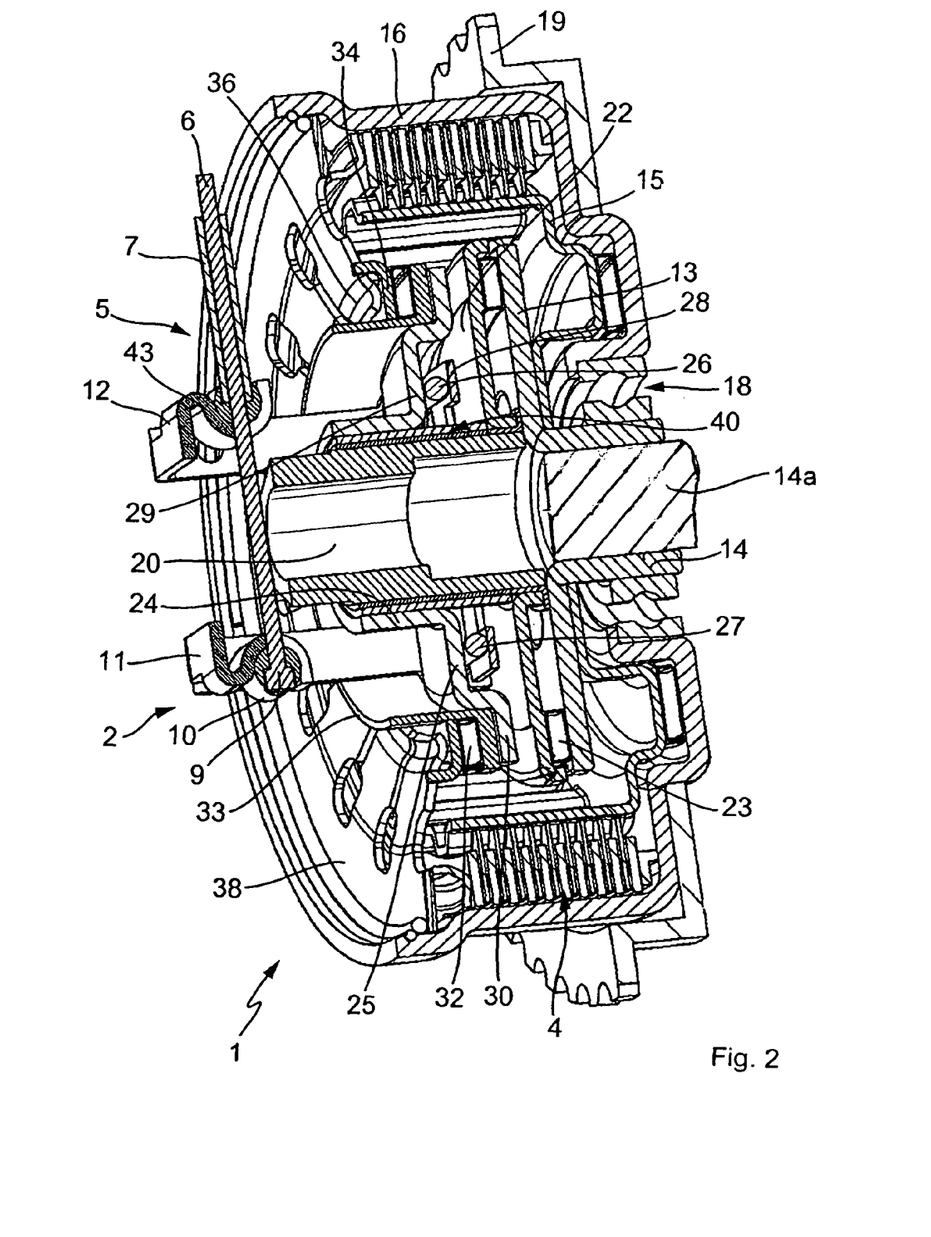
FIG. 2 is a perspective view of a longitudinal cut through the clutch unit of FIG. 1.
Figure 3:
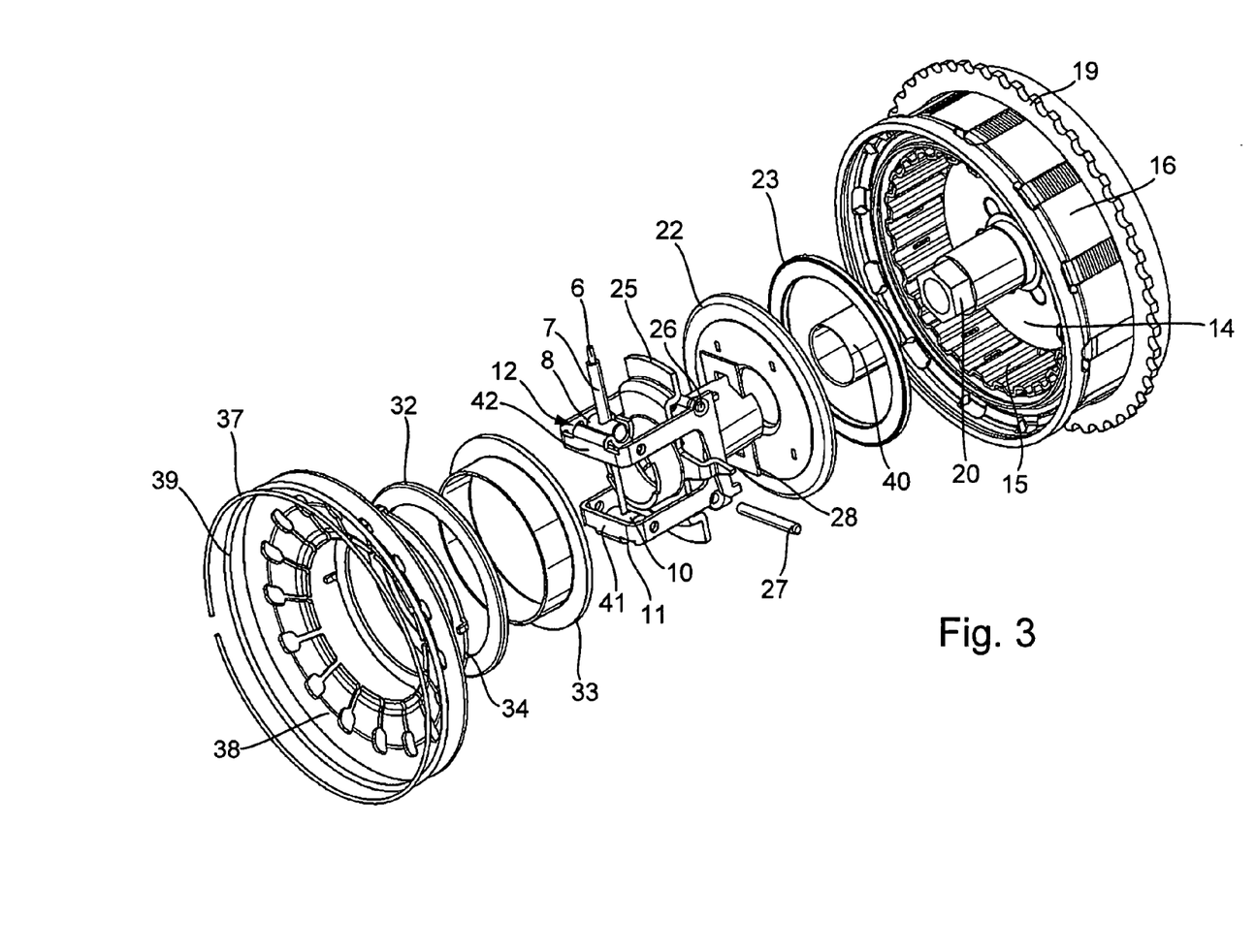
FIG. 3 is an exploded view of the clutch unit of FIGS. 1 and 2.
Figure 4:
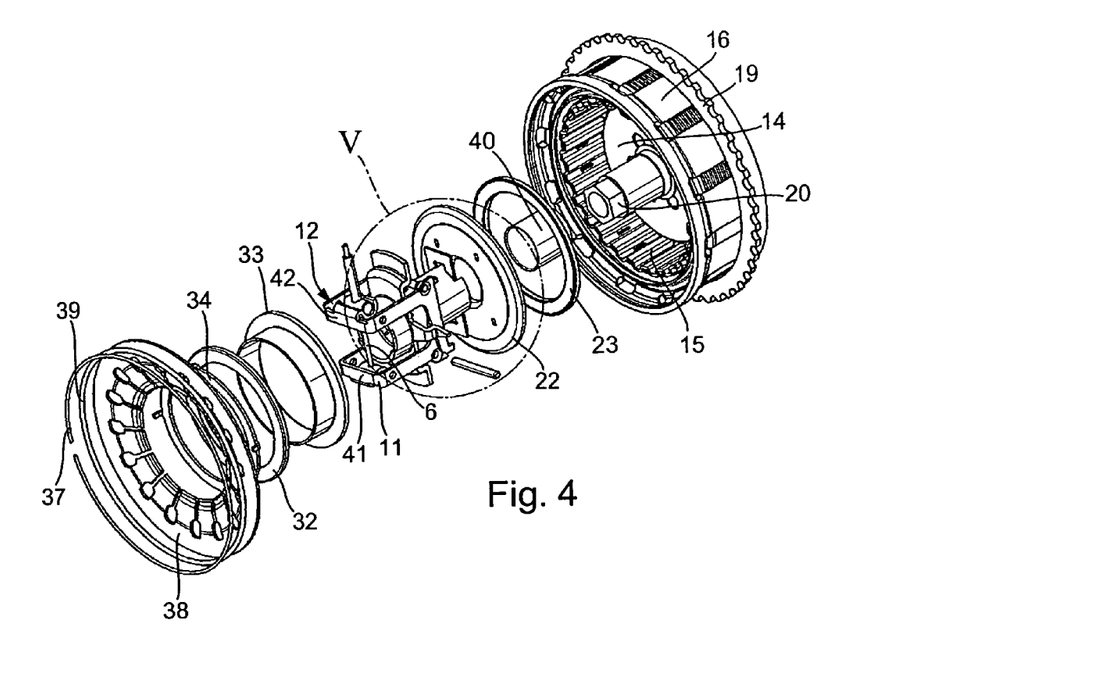
FIG. 4 is a reduced size illustration of the exploded view of FIG. 3.

The clutch unit 1 includes, as evident e.g. from FIG. 2, a clutch hub 14, which is non-rotatably disposed on a shaft 14a, in particular a drive shaft of an internal combustion engine. A clutch hub flange 13 extends radially outwardly from the clutch hub 14, which clutch hub flange is integrally connected with the clutch hub 14. An inner disk carrier 15 is mounted to the clutch hub 14, which inner disk carrier is non-rotatably connected with the inner disks, which interact with the outer disks, which are non-rotatably connected to the outer disk carrier 16.

The outer disk carrier 16 is rotatably supported on the clutch hub 14 by means of a support device 18. A sprocket 19 is mounted at the outer disk carrier 16, which sprocket is e.g. non-rotatably connected to the drive chain of a motorcycle. When the clutch elements 4, thus the inner disks and the outer disks of the illustrated disk set, are in frictional engagement with one another, then torque is transferred from the drive shaft onto the sprocket 19. When the clutch elements 4, thus the outer disks and the inner disks, disengage from one another, the torque transfer between the shaft and the sprocket 19 is interrupted due to an absence of frictional engagement.

The clutch hub 14, and therewith its complete clutch unit 1, is mounted to the shaft by means of a screw element 20. For that purpose, the shaft includes shoulders, which match analogous shoulders of the screw element 20. Furthermore, the shaft includes an external thread at its free end, which external thread interacts with a complementary inner thread of the screw element 20. The outer diameter of the screw element 20 corresponds to the outer diameter of the clutch hub 14. The clutch hub flange 13 faces the screw element 20.

A support bushing 40 is disposed at the screw element 20. The support bushing 40 is configured as a shoulder bushing in the illustrated embodiment and is preferably pressed onto the screw element 20. The support bushing 40 is used for facilitating a relative rotation between the screw element 20 or the clutch hub 14, and a base plate 22, which is a component of the actuation device 2. An axial support device 23 is disposed axially between the base plate 22 and the clutch hub 14, in particular the clutch hub flange 13, which support device facilitates a relative rotation of the clutch hub 14 relative to the base plate 22.

A guide sleeve 24 is furthermore supported at the support bushing 40, which guide sleeve is integrally connected with a lift plate 25. The lift plate 25 interacts with lift pins 26, 27, which are axially disposed between a synchronizer plate 28 and at least one contact portion 29 of the lift plate 25. The synchronizer plate 28 is used for assuring that the lift pins 26, 27 move synchronously relative to one another. On the radially outer side, the lift plate 25 includes a rim portion 30, which is axially offset from the base plate 22.

In the axial direction between the rim portion 30 of the lift plate 25 and an adapter ring 34, an axial support device 32 with a support ring 33 is disposed. The radially inner ends of the disk spring tongues 36 of a disk spring 38 contact the adapter ring 34. The disk spring 38 is axially supported at the outer disk carrier 16 by means of a support ring 37 and by means of a retaining ring 39. The outer periphery of disk spring 38 contacts the inner periphery of the outer disk carrier 16. The disk spring 38 is biased so that the clutch elements 4 are maintained in frictional engagement.

Figure 8:
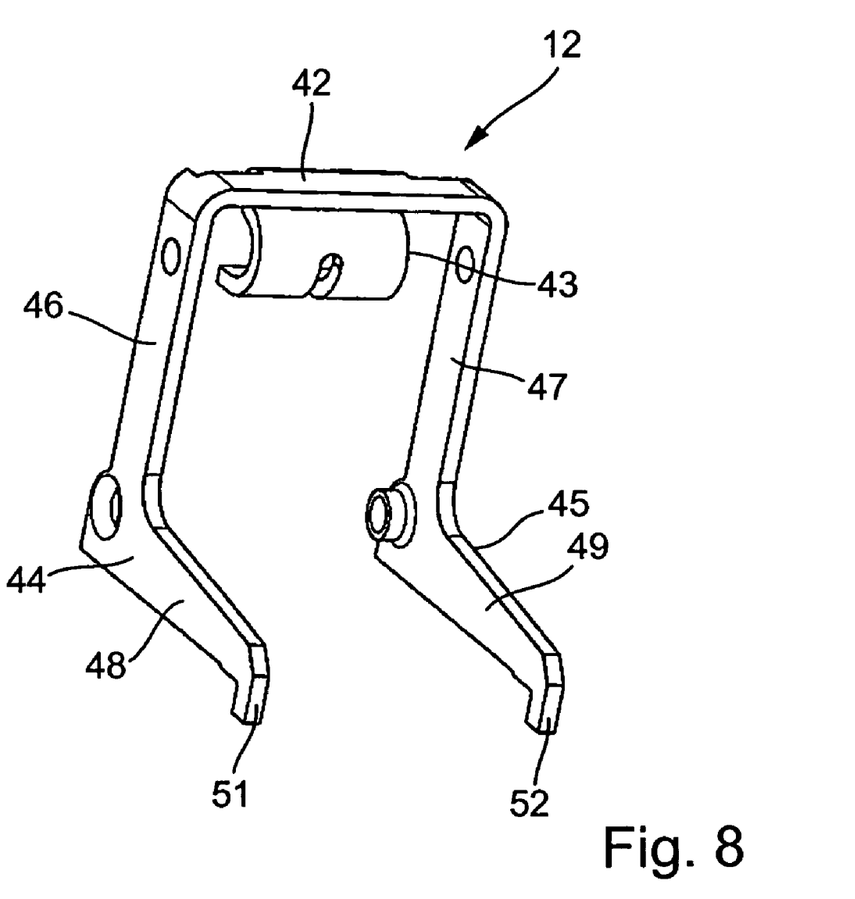
FIG. 8 is a perspective view of a lever element of the clutch unit of FIGS. 1 through 7.
Figure 9:
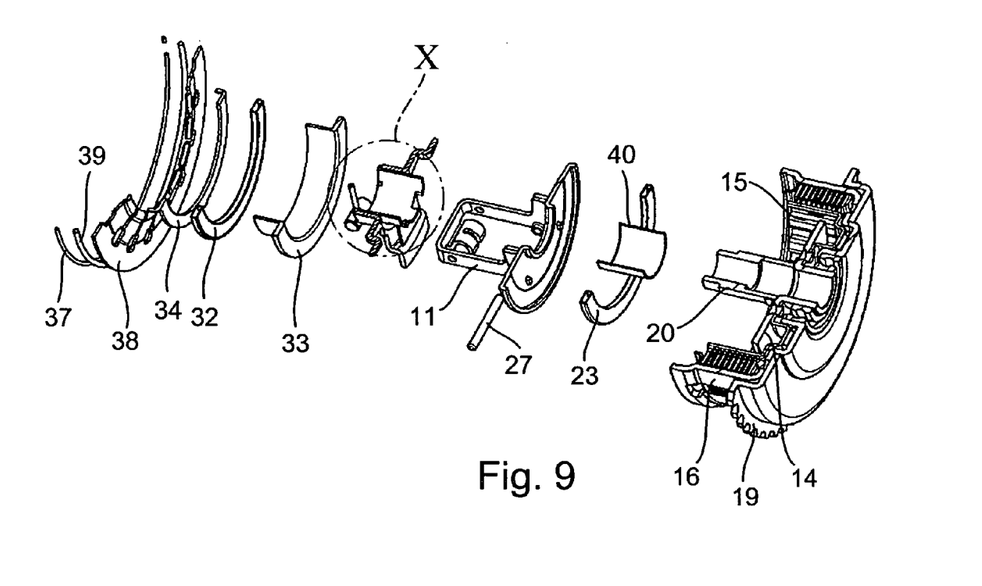
FIG. 9 is an exploded view of the clutch unit of FIGS. 1 through 7 in semi-sectional view.
Figure 10:
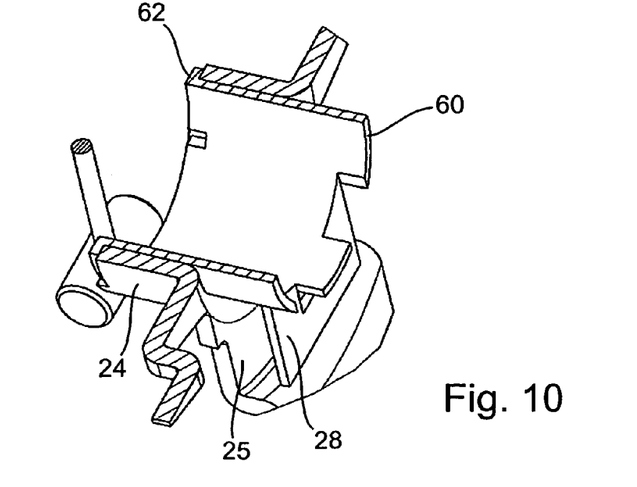
FIG. 10 is an enlarged perspective view of section X of FIG. 9.

The two lever elements 11, 12 include a respective coupling arm 41, 42. A pull cable sleeve receiver 43 is disposed at the coupling arm 42, which pull cable sleeve receiver is integrally connected to the coupling arm 42 and is used for receiving the pull cable sleeve adapter 8. The pull cable sleeve receiver 43 is configured with a slot that is used for passing the pull cable through. In FIG. 8 only the lever element 12 is shown in perspective. The lever element 11 is similarly configured, or is almost identical, wherein the coupling arm 41 is slightly shorter than the coupling arm 42. Furthermore, pull cable adapter 10 is disposed at the coupling arm 41 of the lever element 11, which pull cable adapter is aligned opposite to the pull cable sleeve receiver 43 of the lever element 12.

Two lever arms 44, 45 extend at an angle from the coupling arm 42, which lever arms include a respective connection section 46, 47 and a respective support section 48, 49. The connection sections 46, 47 are positioned perpendicular to the coupling arm 42. The support sections 48, 49, in turn, are vertically disposed relative to the associated connection section 46, 47. Through the connection sections 46, 47, the support sections 48, 49 are integrally connected with the coupling arm 42. A pivot finger 51, 52 extends at an angle from the free ends of the respective support sections 48, 49. The pivot fingers 51, 52 extend parallel to the connection sections 46, 47, and they are integrally connected with the support sections 48, 49.

Figure 5:
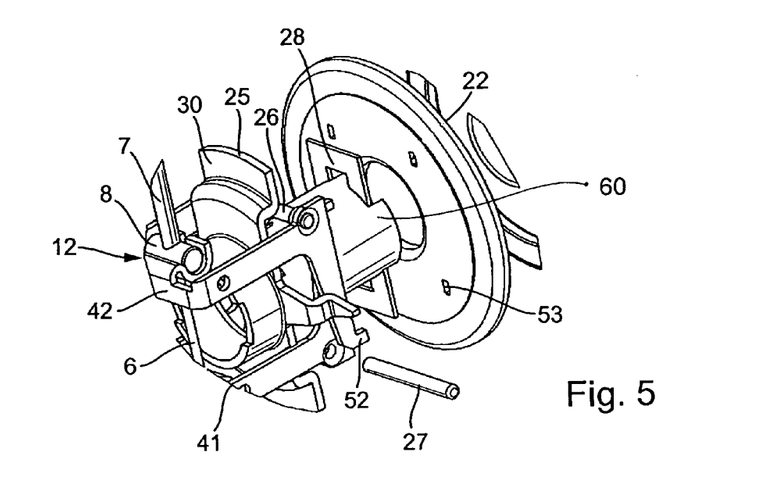
FIG. 5 is an enlarged perspective view of detail V of FIG. 4.
Figure 6:
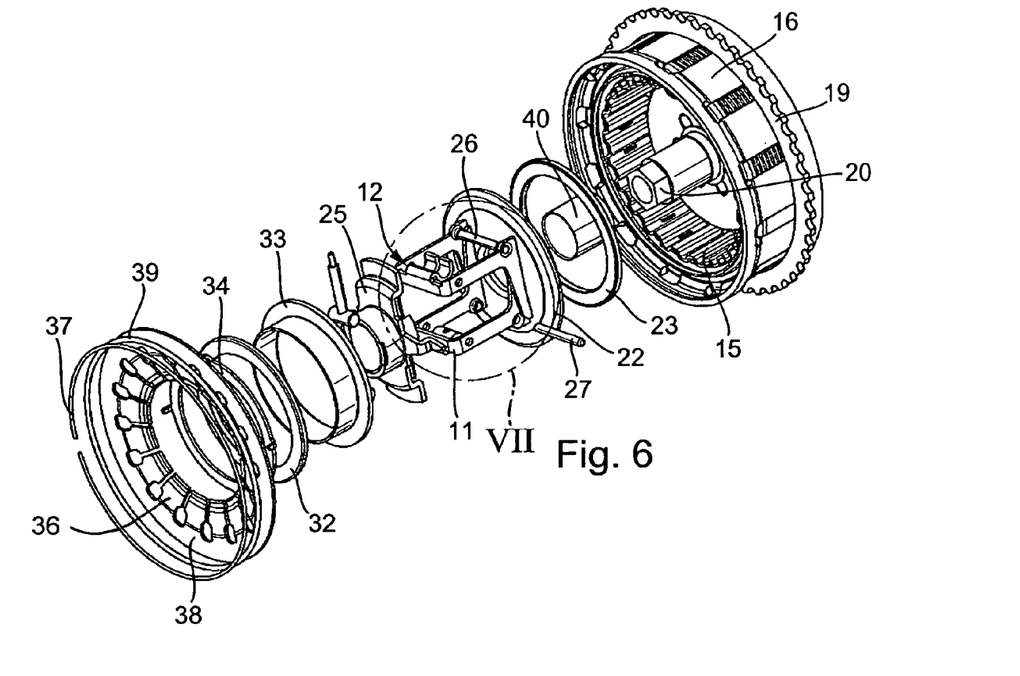
FIG. 6 is a similar exploded view as in FIG. 4.
Figure 7:
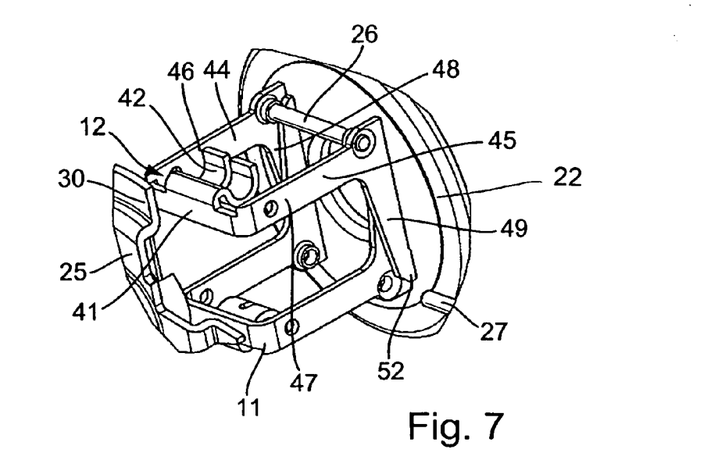
FIG. 7 is an enlarged perspective view of detail VII of FIG. 6.

It is evident from FIG. 5 that the pivot fingers are inserted into associated recesses 53, which are recessed in the base plate 22. In the base plate 22 a total of four recesses 53 are provided, which are used for receiving one respective pivot finger 51, 52 each. Through the pivot fingers 51, 52 inserted into the associated recess 53, the associated lever element 11, 12 is pivotably mounted relative to the base plate 22. The pivot axes are defined by the lift pins 26, 27.

In the non-actuated condition of the lever elements 11, 12, the support sections 48, 49 of the lever elements 11, 12 contact the base plate 22. When the lever elements 11, 12 are actuated by means of the pull cable 6, the coupling arms 41, 42 move toward one another. The lift pins 26, 27 extend between two respective lever arms 44, 45 of the associated lever element 11, 12. Through the synchronizer plate 28, which contacts the lift pins 26, 27, and through a synchronizer sleeve 60, which is integrally connected with the synchronizer plate 28 and is guided on the support bushing 40, the movement of the lift pins 26, 27 is synchronized.

The lift pins 26, 27 move on a substantially circular track about the associated pivot axes of the lever elements 11, 12. The movement component in the axial direction leads to the lift plate 25 moving away from the base plate 22 when the lever elements 11, 12 are actuated by means of the pull cable 6. Thus, slippage of the synchronizer sleeve 60 relative to the lift plate 25 is prevented by a shoulder 62, which reaches around the guide sleeve 24 of the lift plate 25, as is evident in FIG. 10.

The axial movement of the lift plate 25 is transmitted through the axial support device 32 and the adapter ring 34 to the radially inner ends of the disk spring tongues 36 of the disk spring 38. The frictional engagement between the clutch elements 4 is removed by the axial movement of the disk spring tongues 36 away from the clutch hub 14, so that the clutch elements can rotate relative to one another.

During operation of the clutch unit 1, the actuation device 2 does not rotate. Through the support bushing 40 and through the axial support devices 23, 32, it is assured that the components of the clutch unit 1, such as the screw element 20, the clutch hub 14, the inner disk carrier 15, the outer disk carrier 16, and the disk spring 38, can rotate relative to the actuation device 2.

The FIGS. 11 through 18 show a second embodiment of a clutch unit 81 in various perspective views. The clutch unit 81 is actuated by means of a pull cable (not shown) through an actuation device 82 that is mounted to the clutch unit 81. Through the actuation device 82, clutch elements 84 of the clutch unit 81 are disengaged from frictional engagement, so that they can rotate relative to one another.

The clutch unit 81 includes a clutch hub 94, at which an inner disk carrier 95 is mounted. The inner disk carrier 95 is non-rotatably connected with inner disks that interact with outer disks, which are non-rotatably connected to an outer disk carrier 96. The outer disk carrier 96 is rotatably supported on the clutch hub 94 through a support device 98. A sprocket 99 is mounted on the radially outer side at the outer disk carrier 96, which sprocket is engaged by the chain of a motorcycle, for example.

The clutch hub 94 can be placed onto the end of a shaft 94a, in particular a drive shaft of an internal combustion engine of the motorcycle, together with the clutch unit 81 and the actuation device 82. The clutch hub 94 is provided with inner teeth, which are used for non-rotatably connecting the clutch hub 94 with the shaft. The clutch hub 94 can be fixed on the associated shaft end by means of a screw element 100.

The actuation device 82 includes a first coupling element 101, and a second coupling element 102 that can be moved relative to the first coupling element 101 by actuation of a pull cable (not shown), for example. The second coupling element 102 includes a pull cable receiver 103 that is used for fixing an end of the pull cable. The first coupling element 101 includes a pull cable sleeve receiver 104 that is used for axial fixation of one end of a pull cable sleeve (not shown).

Figure 11:
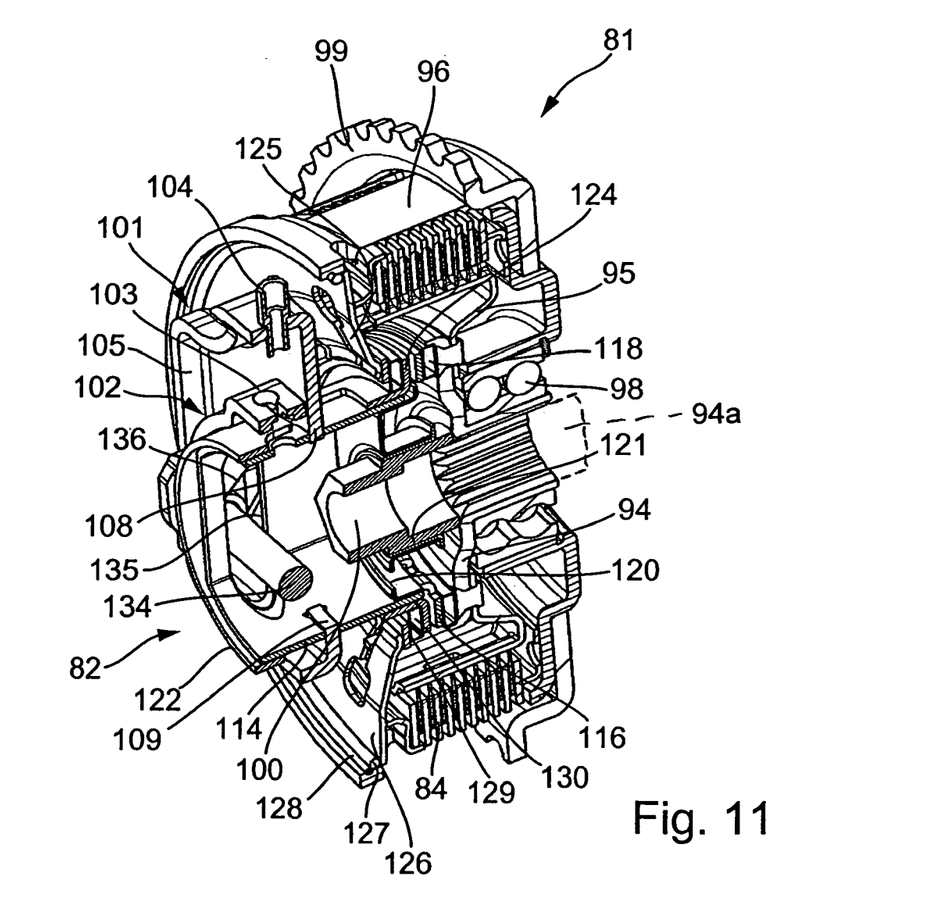
FIG. 11 is a perspective view of a longitudinal sectional view through a clutch unit in accordance with a second embodiment.
Figure 12:
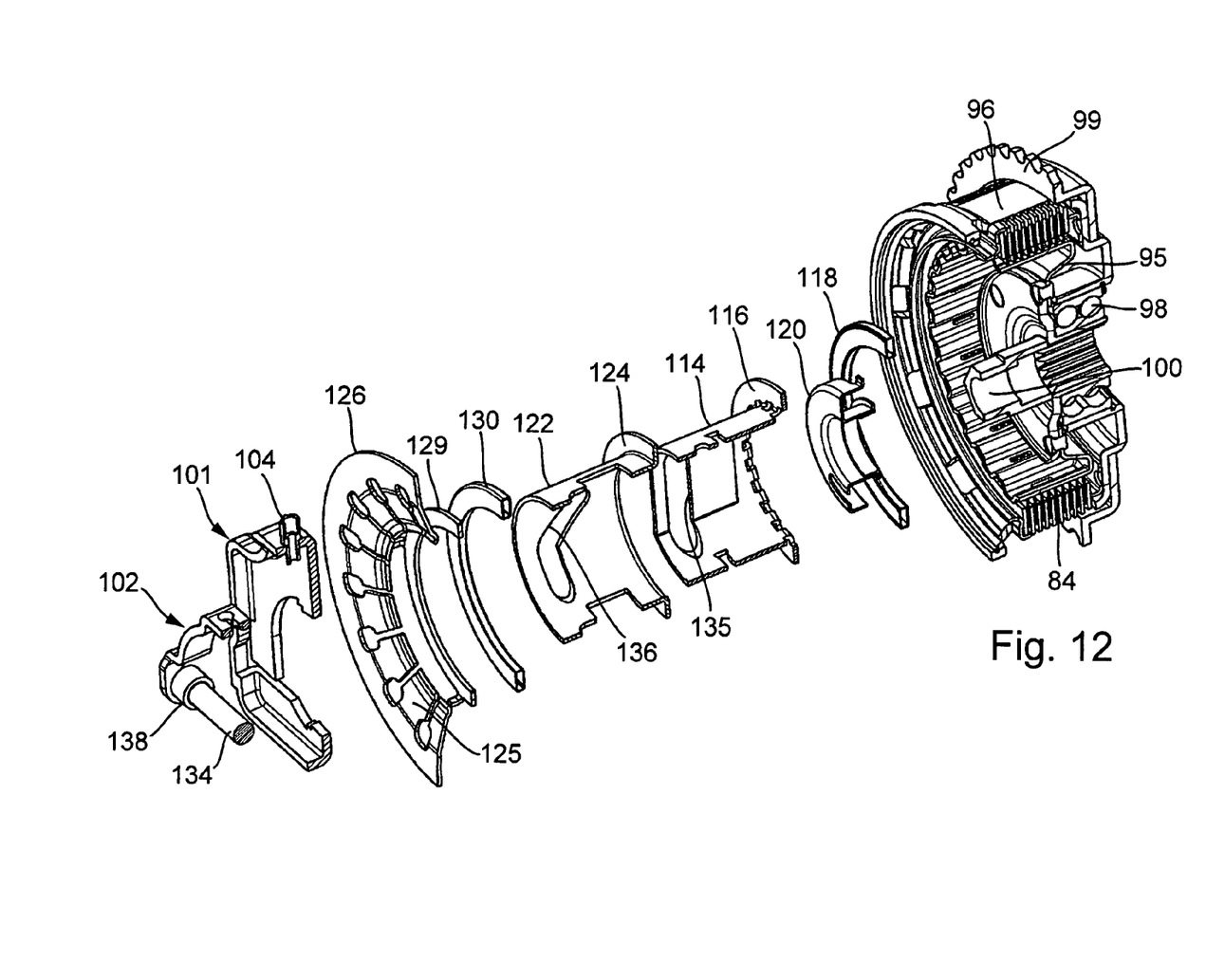
FIG. 12 is an exploded view of the clutch unit of FIG. 11 in semi-sectional view.
Figure 13:
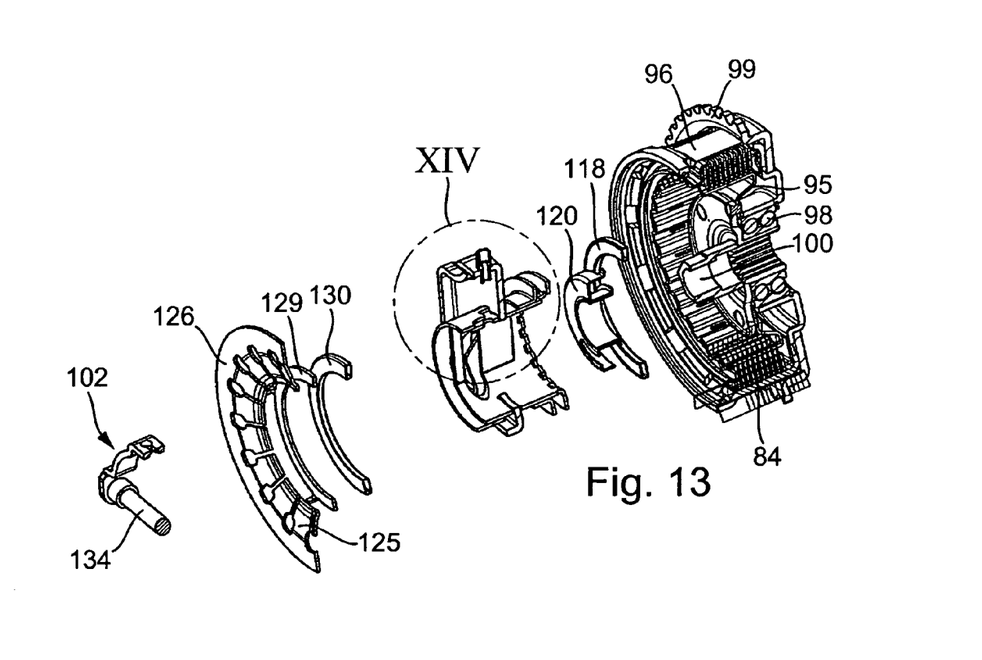
FIG. 13 is a similar exploded view as in FIG. 12.
Figure 14:
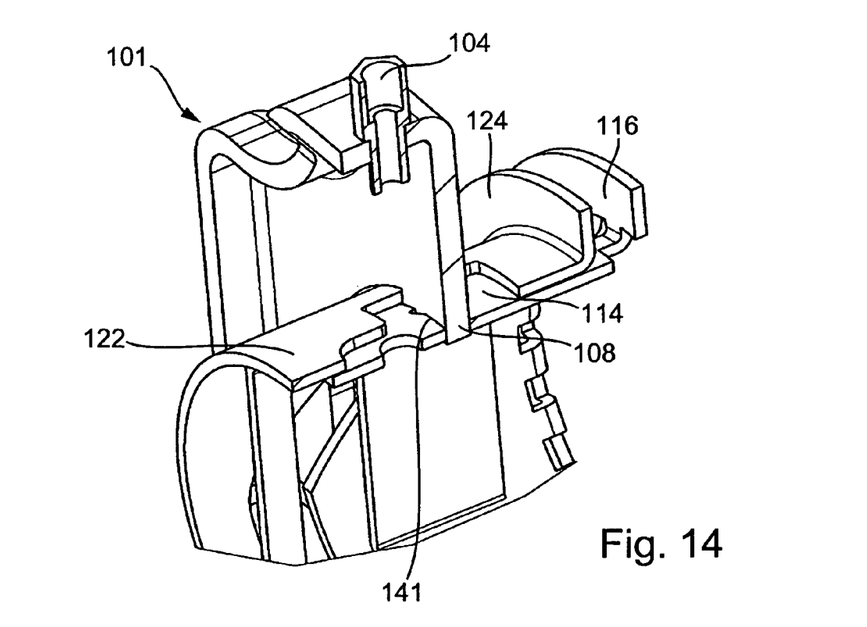
FIG. 14 is an enlarged perspective view of detail XIV of FIG. 13.
Figure 15:
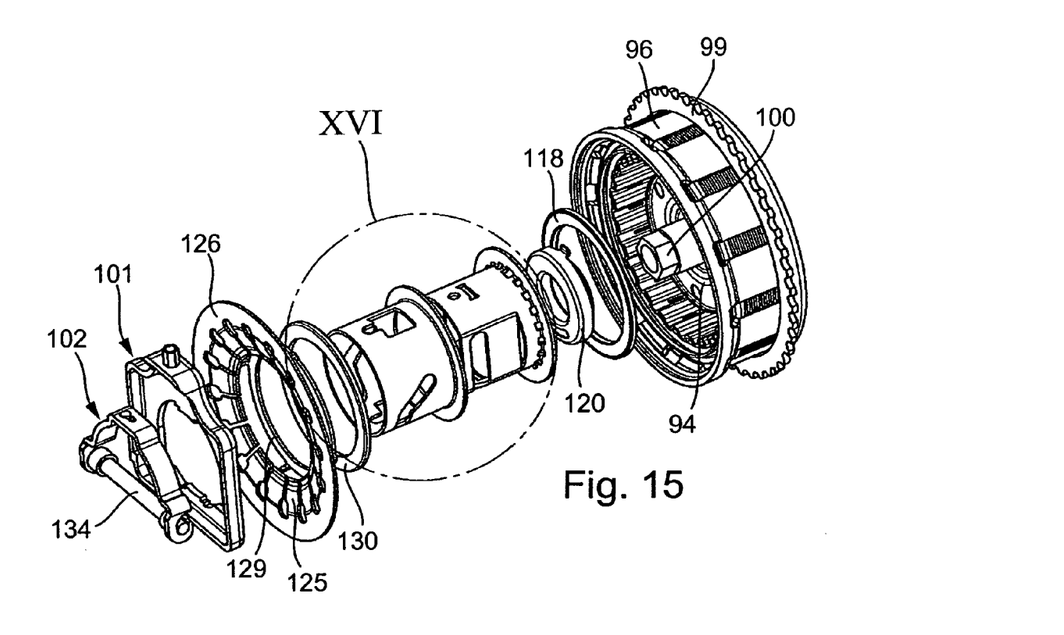
FIG. 15 is an exploded view of the clutch unit shown in FIGS. 11 through 14.
Figure 17:
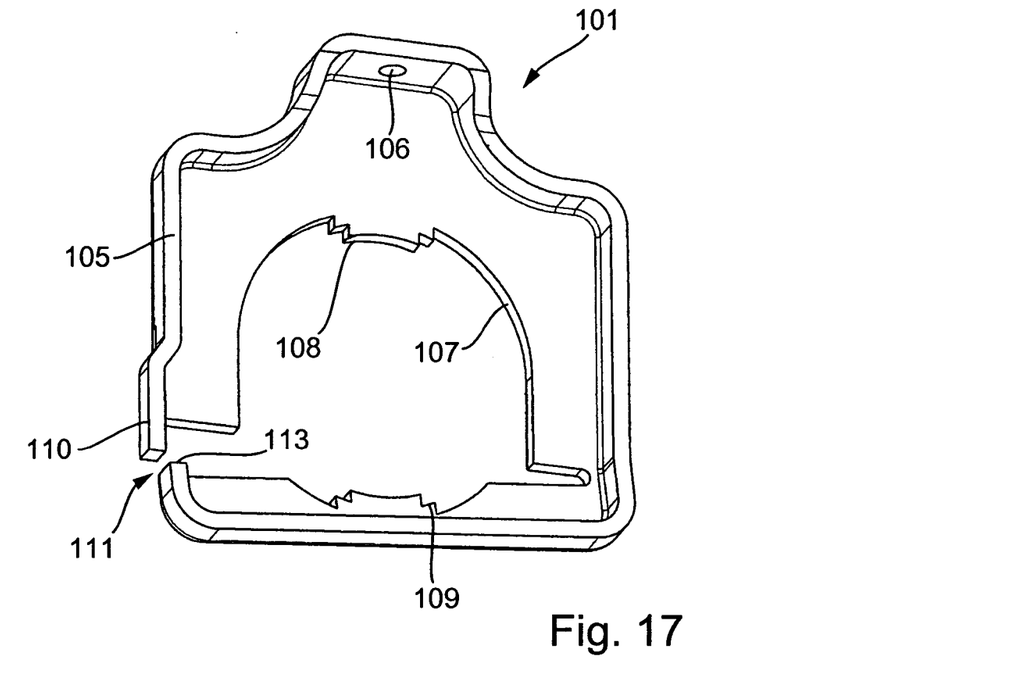
FIG. 17 is a perspective view of a first coupling element of the clutch unit of FIGS. 11 through 16 with an opened frame.
Figure 18:
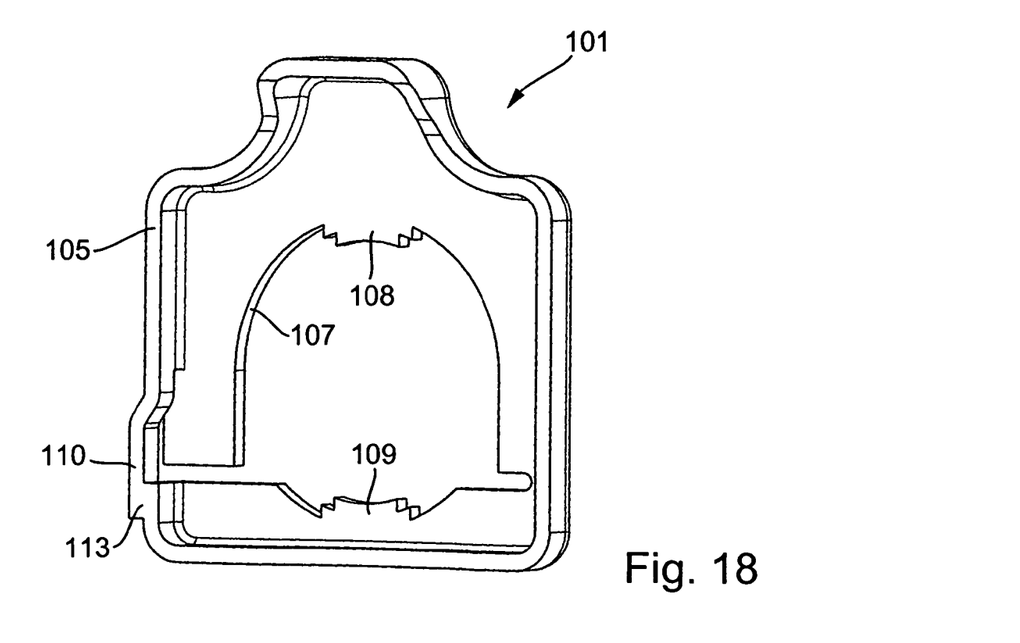
FIG. 18 shows the coupling element of FIG. 17 with a closed frame.

As is evident from FIGS. 17 and 18, the first coupling element 101 includes a frame 105 with a pass-through hole 106 for the pull cable sleeve receiver (element 104 in FIG. 11). The frame 105 includes a central pass-through hole 107, from which form locking elements 108, 109 extend radially inwardly. As is shown in FIG. 17, the frame 105 is open for assembly purposes in the portion of a closing finger 110 after the fabrication of the frame, for example by stamping or forming. In the open condition of the frame 105, the closing finger 110 is offset by a gap 111 from an associated frame component 113. After assembly, the frame is closed and the closing finger 110 is connected with the associated frame component 113, for example bonded, as evident in FIG. 18.

An inner tubular body 114 extends through the central pass-through hole 107 of the first coupling element 101, which inner tubular body includes a shoulder 116 at one end. The shoulder 116 is supported in the axial direction by an axial support device 118, connected therebetween at a clutch hub 94. In radially inward direction, the inner tubular body 114 is centered by means of a centering element 120 on the screw element 100. The centering element 120 is rotatably supported at the screw element 100, e.g. by means of a support bushing 121. During operation of the clutch unit 81, the inner tubular body 114 does not move, but the screw element 100 does. The support sleeve 121 facilitates a relative movement between the screw element 100 and the clutch hub 94 relative to the inner tubular body 114.

The inner tubular body 114 is disposed within the outer tubular body 122, which includes a shoulder 124 at its face. The shoulder 124 of the outer tubular body 122 is disposed axially between the shoulder 116 of the inner tubular body 114 and a disk spring 126. The disk spring 126 is supported in the axial direction at the outer disk carrier 96 by means of a support ring 127 and by a retaining ring 128. On the radially outer side, the outer disk carrier 96 extends around the disk spring 126. Disk spring tongues 125 extend radially inwardly from the disk spring 126, which disk spring tongues contact an adapter ring 129. An axial support device 130 is disposed between the adapter ring 129 and the shoulder 124 of the outer tubular body 122, which axial support device facilitates the rotation of the disk spring 126 relative to the outer tubular body 122.

The second coupling element 102 has substantially the configuration of a circular arc whose ends are connected by a coupling pin 134. The coupling pin 134 extends through two inner slots 135, 155 that are recessed in the inner tubular body 114, and through two outer slots 136, 146 that are recessed in the outer tubular body 122. The inner slots 135, 155 in the inner tubular body 114 extend transversely to the axis of rotation of the clutch hub 94. However, the longitudinal axes of the inner slots 135, 155 do not intersect the axis of rotation of the clutch hub, but they are offset from that axis and extend parallel to one another.

The outer slots 136, 146 of the outer tubular body 122 are inclined relative to the inner slots 135, 155. The angle of inclination is selected so that the outer tubular body 122 moves in an axial direction relative to the inner tubular body 114 when the coupling pin 134 moves in the inner slots 135, 155 by actuation of the pull cable. In the region of the outer slots 136, 146 needle bearings 138 are provided at the coupling pin 134 to reduce the friction losses during force transmission.

Figure 16:
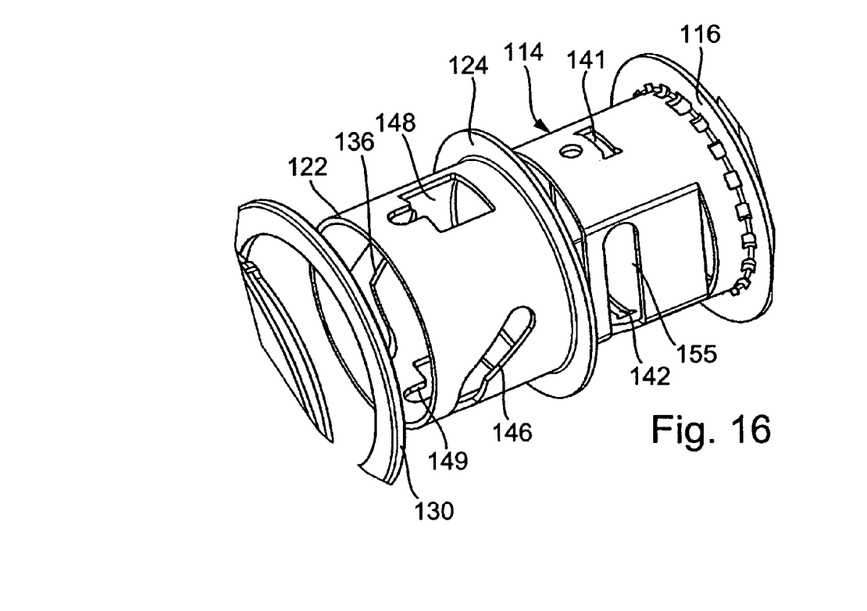
FIG. 16 is an enlarged perspective view of detail XVI of FIG. 15.

It is evident from FIG. 16 that the inner tubular body 114 includes a recess 141 for receiving the form locking element 108, which is provided at the first coupling element 101. Another recess 142 in the inner tubular body 114 receives the form locking element 109. Through the insertion of form locking elements 108, 109 into respective recesses 141, 142 the first coupling element 101 is fixed at the inner tubular body 114. Thus, the form locking elements 108, 109 extend through the recesses 148, 149, which are recessed in the outer tubular body 122.

The recesses 148, 149 respectively are configured as squares whose size is adapted to the axial movement of the outer tubular body 122 relative to the inner tubular body 114 that occur during operation. The extension of the form locking elements 108, 109 through the recesses 148, 149 of the outer tubular body 122 simultaneously prevents rotation of the outer tubular body 122 relative to the inner tubular body 114.

The clutch elements 84 are in frictional engagement with each other through the biasing force of the disk spring 126. When the pull cable is actuated, the second coupling element 102 with the coupling pin 134 moves toward the pull cable sleeve receiver 104 of the first coupling element 101. That means the coupling pin 134 moves upward, as viewed in FIG. 11, in the inner slot 135 of the inner tubular body 114.

The described movement of the coupling pin 134 causes a movement of the outer tubular body 122 to the left, so that the shoulder 124 of the outer tubular body 122 moves toward the disk spring 126, which causes the disk spring 126 to open from its biased closed position. When the pull cable is again released, the biasing force of the disk spring makes the outer tubular body 122 and the coupling pin 134 move back into their starting positions.

It is assured by the support bushing 121 and by the axial support devices 118 and 130 that the components of the clutch unit 81 can rotate without transmitting that rotation to the components of the actuation device 82. The actuation device 82 is prevented from rotating by means of the pull cable actuation components mounted thereon. Mounting of the actuation device 82 at the fixed vehicle components as in the preceding embodiment is not necessary.

Although particular embodiments of the present invention have been shown and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A clutch unit comprising: a clutch hub non-rotatably mounted to a shaft, at least two clutch elements movable into frictional engagement with one another for transmitting torque, wherein the clutch unit is actuated by a mechanical actuation device by means of a pull cable, wherein the actuation device is mounted and supported at the clutch unit, and is axially supported at the shaft and is clamped axially between the clutch hub and a disk spring.

2. A clutch unit in accordance with claim 1, wherein the actuation device is mounted to the shaft together with the clutch unit and is axially supported at the clutch hub.

3. A clutch unit in accordance with claim 1, wherein the actuation device includes two lever elements that are pivotably mounted to the clutch unit.

4. A clutch unit in accordance with claim 3, wherein the lever elements include a respective coupling arm that is coupled to one of the pull cable and a pull cable sleeve, so that the coupling arms move toward each other when the clutch unit is actuated by means of the pull cable.

5. A clutch unit in accordance with claim 4, wherein the pull cable is actuated through a hand actuation lever.

6. A clutch unit in accordance with claim 4, wherein a respective lever arm extends from the ends of the coupling arms, which lever arms include a connection section from which a support section extends at an angle.

7. A clutch unit in accordance with claim 6, wherein a pivot finger extends from the free end of the support section at an angle, which pivot finger engages a recess of a base plate so that the associated lever element is pivotable within limits relative to the base plate.

8. A clutch unit in accordance with claim 7, wherein a respective lift pin extends parallel to the coupling arms between two lever arms of the lever elements.

9. A clutch unit in accordance with claim 8, wherein the lift pins extend between portions in which the connection portions and the support portions of the lever arms transition into one another.

10. A clutch unit in accordance with claim 9, wherein the lift pin of one lever element is disposed proximal to the pivot axis of the other lever element.

11. A clutch unit in accordance with claim 8, wherein the lift pins contact one lift plate that moves axially away from the base plate when the clutch unit is actuated by the pull cable.

12. A clutch unit in accordance with claim 11, wherein the lift pins are disposed axially between the lift plate and a synchronizer plate that is mounted to the lift plate.

13. A clutch unit in accordance with claim 12, wherein the lift plate includes at least one radially outwardly disposed rim portion that interacts with the disk spring.

14. A clutch unit in accordance with claim 11, wherein the lift plate interacts axially with a disk spring or with the disk spring to maintain the clutch elements in frictional engagement when the clutch unit is not actuated by the pull cable.

15. A clutch unit in accordance with claim 14, wherein the lift plate includes at least one radially inwardly disposed contact portion, which is axially offset from the radially outwardly disposed rim portion and at which the lift pins contact.

16. A clutch unit in accordance with claim 15, wherein the radially inwardly disposed contact portion extends radially outwardly from a guide sleeve of the lift plate.

17. A clutch unit in accordance with claim 14, wherein an axial support device is disposed axially between the disk spring and the lift plate.

18. A clutch unit in accordance with claim 17, wherein an adapter ring is axially disposed between the disk spring and the axial support device.

19. A clutch unit in accordance with claim 17, wherein another axial support device is disposed axially between the base plate and the clutch hub.

20. A clutch unit in accordance with claim 1, wherein the actuation device includes a first coupling element, at which a pull cable sleeve is supported, from which the pull cable extends to a second coupling element that is movably mounted at the clutch unit so that it is movable relative to the first coupling element.

21. A clutch unit in accordance with claim 20, wherein the first coupling element includes a frame that extends about an inner tubular body.

22. A clutch unit in accordance with claim 21, wherein the first coupling element includes form locking elements that engage the inner tubular body.

23. A clutch unit in accordance with claim 22, wherein the inner tubular body is centered relative to the shaft through a centering element.

24. A clutch unit in accordance with claim 23, wherein the centering element is rotatably supported on a screw element through which the clutch hub is mounted to the shaft.

25. A clutch unit in accordance with claim 21, wherein the inner tubular body includes a shoulder that is axially supported at the clutch hub.

26. A clutch hub in accordance with claim 25, wherein an axial support device is disposed axially between the shoulder of the inner tubular body and the clutch hub.

27. A clutch unit in accordance with claim 21, wherein the outer tubular body is rotatably disposed relative to the inner tubular body.

28. A clutch unit in accordance with claim 27, wherein the outer tubular body comprises a shoulder, which is supported at the clutch hub in axial direction.

29. A clutch unit in accordance with claim 28, wherein the shoulder of the outer tubular body is loaded with a biasing force of a disk spring or of the disk spring.

30. A clutch unit in accordance with claim 29, including an axial support device disposed axially between the disk spring and the shoulder of the outer tubular body.

31. A clutch unit in accordance with claim 30, including an adapter ring disposed axially between the disk spring and the shoulder of the outer tubular body.

32. A clutch unit in accordance with claim 27, wherein the second coupling element includes a coupling pin that extends through at least one inner slot provided in the inner tubular body, and through at least one outer slot that is provided in the outer tubular body.

33. A clutch unit in accordance with claim 32, wherein the outer slot extends at an angle relative to the inner slot.

34. A clutch unit in accordance with claim 33, wherein the angle between the inner and outer slots is greater than zero and less than 90°.

35. A clutch unit in accordance with claim 33, wherein the inner slot extends transversely relative to the axis of rotation of the clutch hub.

* * * * *